US009215287B2

(12) United States Patent
Meckler et al.

(10) Patent No.: US 9,215,287 B2
(45) Date of Patent: Dec. 15, 2015

(54) METHOD FOR NOTIFICATION OF EVENTS ON A DEVICE RUNNING MULTIPLE USER IDENTITIES

(71) Applicant: France Telecom, Paris (FR)

(72) Inventors: Brian Meckler, Kensington, CA (US); Joseph Arceneaux, San Francisco, CA (US)

(73) Assignee: FRANCE TELECOM, Paris (FR)

( * ) Notice: Subject to any disclaimer, the term of this patent is extended or adjusted under 35 U.S.C. 154(b) by 162 days.

(21) Appl. No.: 13/720,377

(22) Filed: Dec. 19, 2012

(65) Prior Publication Data

US 2013/0159417 A1    Jun. 20, 2013

Related U.S. Application Data

(60) Provisional application No. 61/577,389, filed on Dec. 19, 2011.

(51) Int. Cl.
*H04L 29/08* (2006.01)

(52) U.S. Cl.
CPC ...................... *H04L 67/22* (2013.01)

(58) Field of Classification Search
CPC combination set(s) only.
See application file for complete search history.

(56) References Cited

U.S. PATENT DOCUMENTS

| | | | |
|---|---|---|---|
| 2010/0222027 A1* | 9/2010 | Scott et al. | 455/412.2 |
| 2011/0154136 A1* | 6/2011 | Osuki | 714/57 |
| 2012/0159139 A1* | 6/2012 | Kim et al. | 713/2 |
| 2012/0198002 A1* | 8/2012 | Goulart et al. | 709/206 |
| 2012/0317498 A1* | 12/2012 | Logan et al. | 715/752 |
| 2013/0078959 A1* | 3/2013 | Reeves et al. | 455/412.2 |
| 2013/0145278 A1* | 6/2013 | Newell et al. | 715/738 |

OTHER PUBLICATIONS

Rowinski, "Dual-Persona Smartphones: BlackBerry Balance for Work and Play", May 2, 2011, 5 pages.
Konstant, "Which dual-persona interface would you choose? A question of user experience", May 11, 2011, 2 pages.
Samsung Ch@t 322, "Double the mobility", at http://www.samsung.com/sg/consumer/mobile-devices/mobile-phone/non-touch/GT-C3222LKAXSP, retrieved May 16, 2013, 3 pages.
VMware Horizon Mobile, at http://www.vmware.com/fr/products/desktop_virtualization/mobile.html, retrieved May 16, 2013, 2 pages.
Belic, "SEVEN brings its mobile messaging solution to Android", Feb. 17, 2009, 5 pages.

* cited by examiner

*Primary Examiner* — Brian J Gillis
*Assistant Examiner* — Gil H. Lee
(74) *Attorney, Agent, or Firm* — David D. Brush; Westman, Champlin & Koehler, P.A.

(57) ABSTRACT

The present method and system implements a method for presenting notifications on an electronic device partitioned into two or more distinct instances, each instance being aware of separate sets of events associated to applications running in that instance. The method includes collecting for each instance the notifications corresponding to the separate sets of events, rendering in the active instance the active instance notifications using a first display mode, while rendering the other instance notifications using a second display mode.

11 Claims, 8 Drawing Sheets

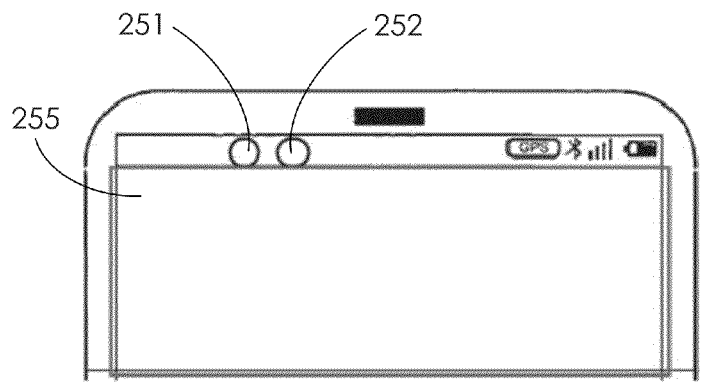
FIGURE 2C
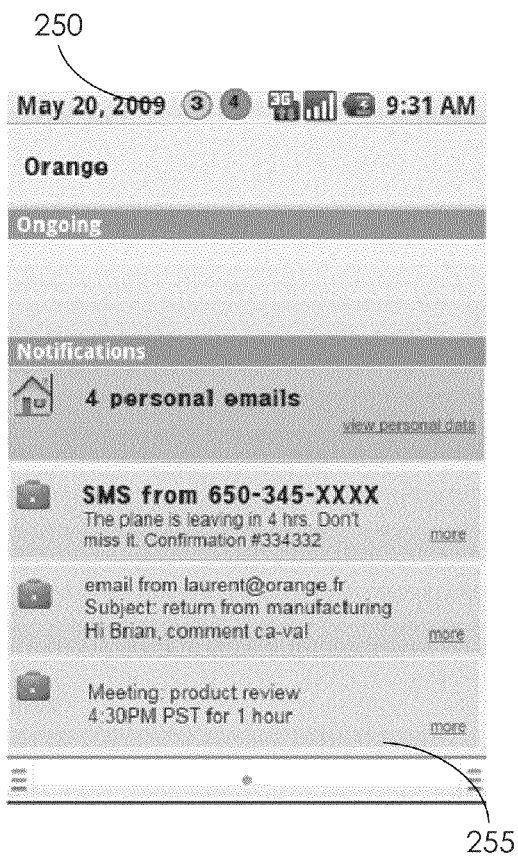 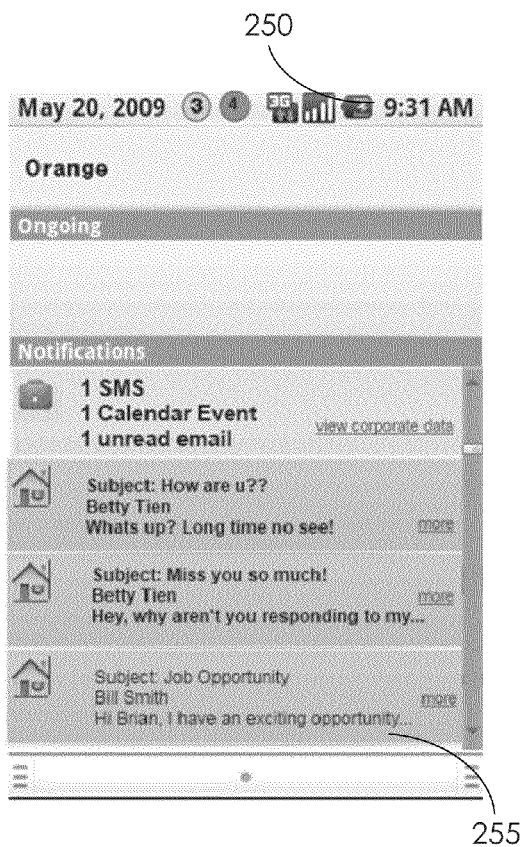
FIGURE 2D FIGURE 2E

METHOD FOR NOTIFICATION OF EVENTS ON A DEVICE RUNNING MULTIPLE USER IDENTITIES

CROSS-REFERENCE TO RELATED APPLICATION

The present application is based on and claims the benefit of U.S. Provisional Patent Application No. 61/577,389, filed Dec. 19, 2011, the content of which is hereby incorporated by reference in its entirety.

FIELD OF THE PRESENT SYSTEM

The present disclosure generally relates to communication management and in particular to management of notification transmission to a user.

It finds applications, in particular while not exclusively, in user communication equipment adapted to run applications for which notifications can be received, such as a mobile device, a Smartphone, a Personal Digital Assistant (PDA), laptop or desktop computers.

BACKGROUND OF THE PRESENT SYSTEM

Over the last few years, the development of web applications such as social networks and messaging services has lead to an important increase of information that needs to be continuously updated and transmitted to the users of such services.

Such web applications can be accessed in a plurality of ways by the user, for example using electronic or communication devices such as a mobile device (e.g. a Smartphone), a personal computer, a tablet or a laptop. To this end, such communication devices are adapted to run a plurality of such web applications that give an access to different services such as social networks or messaging services, such as Gmail™, Facebook™, Twitter™, Hotmail™, etc. Other web applications may comprise news and location applications for instance.

When a data update is made available on one of these services, such as a new message or an invitation to an event, a new notification is received on the electronic device of the user and displayed to his attention, for instance on the device screen.

As most users now have several devices, it may prove cumbersome to keep up with all notifications issued by the user's several devices.

To avoid multiplicity of electronic devices for a same user, employees at many enterprises are now allowed to use their personal phones for business purposes. Such electronic devices can run different instances, each accessible through an authentication process for instance. This may be implemented e.g. through the use of several virtual machines or partitioning of the device. In the following description, each identity of a user (personal or consumer, corporate, etc.) will be referred also as a persona or mode.

With such multiple persona enabled devices, a user can connect with his personal electronic device to corporate data and resources as well as use corporate applications, which can cause security issues. Alternatively, a user can connect to his personal data using his corporate electronic device.

There is a variety of commercially available solutions to this problem such as effectively creating an absolute firewall between the employee's personal data and applications and the company's sensitive data and applications for a same device.

A pitfall of such strong segregation between the different personas is the handling of notifications. Indeed, if the employee is using his mobile device in a consumer mode (the active persona), he will not be notified of corporate events or conditions unless he switches into that corporate mode. The same is true in the reverse case (i.e.: a user is using his/her mobile device in the corporate mode which means the user will not be proactively notified of consumer specific events).

As the focus is on the separation of the modes for a same device, the user will miss notifications he would have received if he had kept several electronic devices.

Alternatively, other existing solutions present the opposite problem, i.e. the different personas will expose all notifications regardless of what persona is active. In other words, no segregation is implemented between the personas. Say a user has a social network activity with content not suitable for work (NSFW), he may not be happy about receiving notifications from his (private) social network activity while in the corporate persona reviewing a presentation with colleagues. Conversely, when in the personal mode, an employee may not want to see some sensitive corporate information show up on his display through corporate notifications.

Today there is a need that allows a user to keep track of notifications for multiple personas enabled electronic devices. There is a further need for a solution that is not counterproductive with the needed separation of the persona.

SUMMARY OF THE PRESENT SYSTEM AND METHOD

An exemplary aspect of the present disclosure relates to a method for presenting notifications on an electronic device partitioned into two or more distinct instances, each instance being aware of separate sets of events associated to applications running in that instance, the method comprising:

collecting for each instance the notifications corresponding to the separate sets of events, rendering in the active instance the active instance notifications using a first display mode, while rendering the other instance notifications using a second display.

Thanks to the present method, the notifications are collected for the events from the different personas running on the communication device and are represented using different modes to the user. One mode may comprise rendering detailed information about the notifications, like existing notifications with most commonly used web applications. Another mode may degrade or hide most of the notification content. It may for instance be limited to just the number of notification, so that the user is aware of the events with his other personas.

The present system also teaches an electronic device partitioned into two or more distinct instances, each instance being aware of separate sets of events associated to applications running in that instance, the electronic device being arranged to:

collect for each instance the notifications corresponding to the separate sets of events, render in the active instance the active instance notifications using a first display mode, while rendering the other instance notifications using a second display mode.

The present system also teaches a computer program product recorded on a storage medium and executable by a computer in the form of a software agent including at least one software module setup to implement a method for presenting notifications on an electronic device partitioned into two or more distinct instances, each instance being aware of separate sets of events associated to applications running in that instance, the computer program comprising instructions to:

collect for each instance the notifications corresponding to the separate sets of events, render in the active instance the active instance notifications using a first display mode, while rendering the other instance notifications using a second display.

The present system also teaches an electronic device partitioned into two or more distinct instances, each instance being aware of separate sets of events associated to applications running in that instance, the electronic device being arranged to:

collect for each instance the notifications corresponding to the separate sets of events, render in the active instance the active instance notifications using a first display mode, while rendering the other instance notifications using a second display mode.

The present system also teaches a computer program product recorded on a non transitory computer readable storage medium and executable by a computer in the form of a software agent including at least one software module setup to implement the present method.

BRIEF DESCRIPTION OF THE DRAWINGS

The present system, call management node and method are explained in further detail, and by way of example, with reference to the accompanying drawings wherein:

FIGS. 2A to 2E represent different GUIs (graphical user interfaces) illustrating different embodiments of the present system;

DETAILED DESCRIPTION OF THE PRESENT SYSTEM AND METHOD

Figure 1:
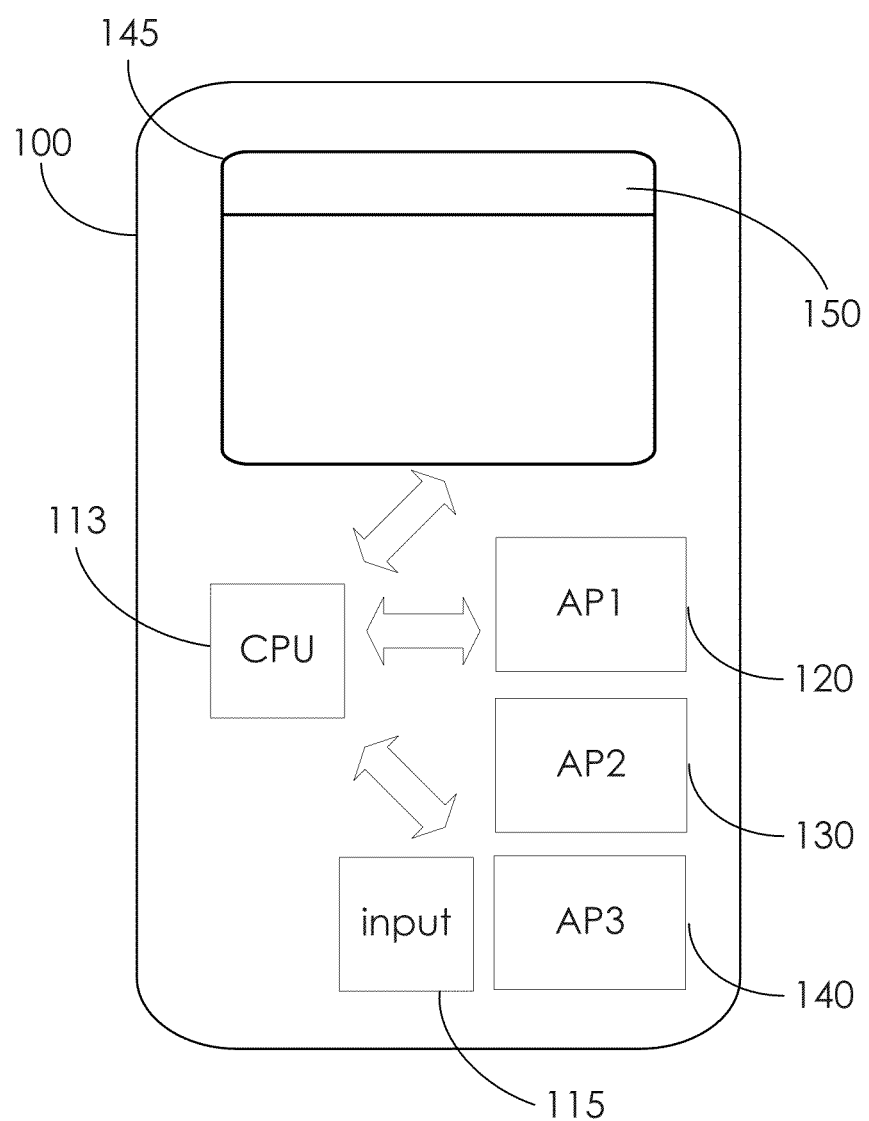
FIG. 1 represents a communication device according to an embodiment of the present system.

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, base stations, gateways or other entities in a telecommunication network are not detailed as their implementation is beyond the scope of the present system and method.

For purposes of simplifying a description of the present system, the terms "operatively coupled", "coupled", and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. Another operative coupling may include a wired and/or wireless coupling to enable communication between a content server of a telecommunication network and one or more user devices, the communication generating for instance sets of events and corresponding notifications on the user device.

Unless specified otherwise, the exemplary embodiment here after will be described in its application to an electronic device such as a mobile device that can connect to a telecommunication network. The present exemplary embodiment is in no way a limitation of the scope of the present method and system as other telecommunications devices such tablets, desktop or laptop computers, or any other electronic device with communication capacities may be used by the man skilled in the art.

In addition, it should be expressly understood that the drawings are included for illustrative purposes and do not represent the scope of the present system.

The term rendering and formatives thereof as utilized herein refer to providing content, such as digital media or a graphical user interface (GUI), such that it may be perceived by at least one user sense, such as a sense of sight and/or a sense of hearing. For example, the present system may render a user interface on a display device so that it may be seen and interacted with by a user. The term rendering may also comprise all the actions required to generate a GUI prior to the display, like e.g. a map representation generated on a server side for a browser application on a user device.

A GUI is a type of user interface which allows a user to interact with electronic devices such as computers, hand-held devices such as smartphones or tablets, household appliances, office equipment and the likes. GUIs are typically used to render visual and textual images which describe various visual metaphors of an operating system, an application, etc., and implemented on a processor/computer including rendering on a display device. Furthermore, GUIs can represent programs, files and operational functions with graphical images, objects, or vector representations. The graphical images can include windows, fields, dialog boxes, menus, icons, buttons, cursors, scroll bars, maps, etc. Such images can be arranged in predefined layouts, or can be created dynamically (by the device itself or by a web-based server) to serve the specific actions being taken by a user. In general, the user can select and/or activate various graphical images in order to initiate functions and tasks, i.e. controls, associated therewith. By way of example, a user can select a button that opens, closes, minimizes, or maximizes a window, an icon or an active link that launches a particular application program. By way of another example, the GUI may present a typical user interface including a windowing environment and as such, may include menu items, pull-down menu items, icons, pop-up windows, etc., that are typical of those provided in a windowing environment, such as may be represented within a Windows™ Operating System GUI as provided by Microsoft Corporation and/or an OS X™ Operating System GUI, such as provided on an iPhone™, MacBook™, iMac™, etc., as provided by Apple, Inc., and/or another operating system.

In the description here after, an application program (AP)—or software—may be seen as any tool that functions and is operated by means of a computer, with the purpose of performing one or more functions or tasks for a user or another application program. To interact with and control an AP, a GUI of the AP may be displayed on the user device display. APs may be for instance connected APs like a text or email AP, web applications like news or map applications. APs may also be resident applications, i.e. APs that either do not need data connection or can work offline, like an agenda, a clock, a task manager, a battery monitor, etc.

FIG. 1 is an illustration of an exemplary user device 100 used in the present system. In the here after description, the user or electronic device is illustrated as a mobile device 100. The mobile device 100 comprises a display device 145, a processor 113, an input device 115 and a plurality of APs, here for instance 3 applications, AP1 to AP3 corresponding respectively to reference numbers 120 to 140.

In the present system, the user interaction with and manipulation of the application program rendered on a GUI may be achieved using the display device 145, or screen, which is presently a touch panel operationally coupled to the processor 113 controlling the displayed interface. The input device 115 and display device 145 are thus merged. Some mobile device 100 today may also present an input device 115 like a keyboard.

Processor 113 may control the rendering and/or the display of the GUI on the display device 145 depending on the type of application program, e.g. resident or web-based. Processor 113 may also handle the user entries according to the present method. The touch panel 145 can be seen as an input device allowing interactions with a finger of a user or other devices such as a stylus. Touch sensor interface or touch panel 145 may include any suitable circuitry to convert analog signals corresponding to touch input received over its surface into any suitable digital touch input data. Such touch input data can, for example, be used to make selections of portions of the GUI of an AP. The input received from a user's touch is sent to the processor 113. The touch panel 145 is configured to detect and report the (location of the) touches to the processor 113, which can interpret the touches in accordance with the application program and the currently displayed GUI. For example, the processor 113 can initiate a task, e.g. a control of the AP like the notification bar of the present system.

The touch panel 145 can be based on sensing technologies including but not limited to capacitive sensing, resistive sensing, surface acoustic wave sensing, pressure sensing, optical sensing, and/or the likes.

In the present system, the electronic device 100 is running several distinct instances. This may be enabled through a plurality of virtual machines, each corresponding to an instance (it may even be operated through a different Operating System (OS)). Alternatively this may be enabled through a partitioning per user, as known for instance with the Microsoft Windows™ OS. Examples are known from phones using dual SIM cards like Blackberry Balance for Work & Play™ (http://www.readwriteweb.com/archives/dual-persona_smartphones_blackberry_balance_for_wo.php). In these different implementations, an instance manager, along with a login manager, may be provided for switching back and forth between these instances (not shown in FIG. 1).

As mentioned previously, a strong segmentation often comes with these different instances or personas as data from a first instance is not visible from the other instance. A user will have to switch instances through some authentication process, like entering a password, to access data likes updates, from the other persona.

In existing OSs like Android™ or the Apple iPhone OS (IOS), a notification bar enables the user to become aware of any events on his electronic device. Events generally correspond to (data) updates to an AP running on the device, like new incoming email(s) or text(s), breaking news for a sports or news AP, alarm for a clock or a task manager running too many APs that could slow down the electronic device. The events are presented for instance in a notification bar through:

the number of collected notifications the number of notifications per category, if each notification is associated to different categories (generally corresponding to the category of the AP causing the event resulting in the notification), snippet for the notification, like metadata associated to the event and/or the AP causing the event, a selectable element, either the notification bar itself, the number of notifications or the snippet, that will enable the processor 113 to render further metadata for the notifications upon selection of the selectable element by the user.

In the present system, the electronic device 100 is running two or more instances, one of them being the active instance the user can interact with. One or more notification engine(s) (as seen in FIG. 4) may be provided to collect for each instance the notifications corresponding to sets of events. Indeed, the notification engine(s) monitor, as described later on in relation with FIG. 4, the sets of events associated to running APs. To enable the present system, the electronic device will use different display modes per instance. Indeed, it may render the notifications per persona using a plurality of display modes.

Figure 2A:
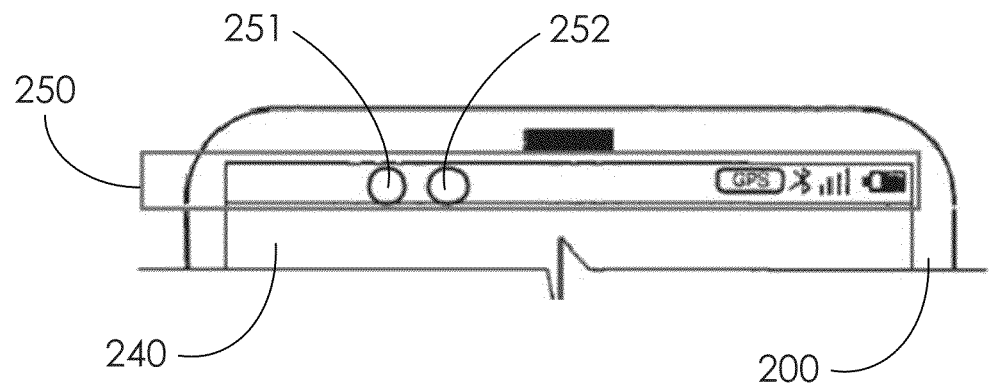

Using the known embodiment of the notification bar, an exemplary innovative implementation for the present system is presented in FIG. 2A. The notification bar 250 is placed at the top of the display screen 240 for the electronic device 200. In this illustrative embodiment, two instances are running. The first and second display modes comprise a common initial display mode which allows the display of the number of notifications per instance. This may be enabled e.g. through an icon, hence one icon per running instance, as seen in FIGS. 2A and 2B.

Indeed, referring to FIG. 2A, a first icon 251 indicates the number of notifications for the active instance while a second icon 252 indicates the number of notifications for the other instance. The active instance or persona may be for instance the professional instance as the user is currently working with his electronic device. The other instance, referred to here after as inactive or dormant instance may be his personal instance, running APs such as emails, text, calls, etc.

In the here present system, dormant or inactive does not mean that the corresponding instance is shut down, as APs are still running (and connected e.g. over the air if needed) to generate events leading to the notifications. Dormant or inactive means that this is not the instance the user is currently interacting with.

Figure 2B:
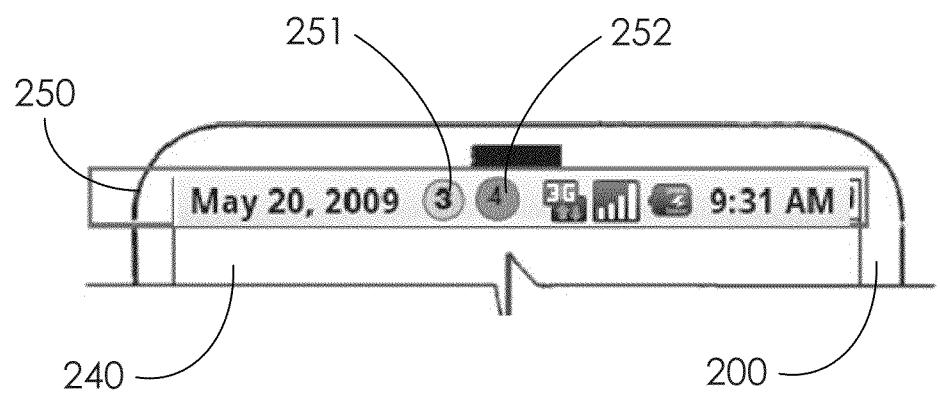

Thanks to the present system, the user, as illustrated with FIG. 2B, can be aware of the notifications in any of his instances running on his electronic device 200. Each notification icon per instance may be rendered using a different emphasis like a different color (see icon 251 showing 3 notifications for the active persona while icon 252 is showing 4 notifications for the other persona).

As mentioned before, the icons 251 or 252 may be distinct selectable elements. Depending on the chosen display mode, touching one of the notification icons will cause the processor of the electronic device 200 to further display details from the notifications. To that effect, a notification window 255 as seen in FIG. 2C may appear upon activation of one of the notification icons 251 or 252.

In an alternative exemplary embodiment of the present system, the number of notifications may be presented using one common selectable element, like in the know example of the notification bar. Icons 251 and 252 may be comprised in that notification bar 250 as seen in FIG. 2B, the touching of which (like a sliding touch input) will open the notification window 255, with further details about the notifications.

FIGS. 2D and 2E are exemplary embodiments of the notification window 255. Generally speaking, each notification in the two or more distinct instances comprises different metadata associated to an event and/or the associated application. This may be for instance:
- application causing the notification (like phone, SMS, email, news AP, weather AP, agenda, etc.)
- time of the data update linked to the notifications,
- nature of the update, like a missed called or confirmation receipt of a text, new appointment in the agenda, etc.
- initiator of the update (caller, sender of the mail or the text, origin of the new entry in the agenda, etc.
- link to the update (like a link to a tweet, a new mail)
- a snippet (extract) or the whole content of the notification (like headline of the news, first lines of the mail, content of a text), etc.

Each display mode may be seen as a set of rules or filters applied to these different metadata. In the present system, the first display mode associated with the active instance allows to display metadata that will not be visible for the notifications from the other instances. As the general context is still to keep the separation between the different instances' data, the second display mode hide some of the same metadata. Say one email, one agenda and one text APs are running in both instances as seen in FIGS. 2D and 2E.

In the example of FIG. 2D, the corporate instance is the active one while the personal instance is dormant. The senders of a new email and text, causing an email and an SMS notifications in the active instance, will be visible in the notification window 255. Conversely, the same metadata for an email and a text notification in the personal (dormant) instance will be hidden. Only information about the application, and the number of notifications, may be displayed to the user.

In the other example of FIG. 2E, the active instance or persona is the personal one while the business persona is dormant. Details about the notifications (subject, first lines of the emails) will be visible to the user when in the personal (active) mode, while only the number of notifications per APs will be visible for the business persona. Thanks to the present system, the first display allows displaying more metadata about notifications then the second display mode. Based on the choices of metadata that are not displayed with the second display more, while available to the first display mode, a strong separation between the different personas is maintained. Allowing several personas in one single electronic device is still possible, as the user has only partial access to the notifications from the dormant personas.

Such a distinction is also made over existing solutions that do not segregate notifications between personas, i.e. that all notifications from all personas are displayed to the user, not matter what persona he is in. Having distinct display mode like in the present system ensure privacy between instances.

In an additional embodiment of the present system, the metadata for the second display mode may be limited:
- the number of notifications
- metadata about the application that caused the event (like the data update)

Thus, the first display mode may render further metadata like a snippet of the data update, and the initiator of the update (like name of the sender).

Figure 4A:
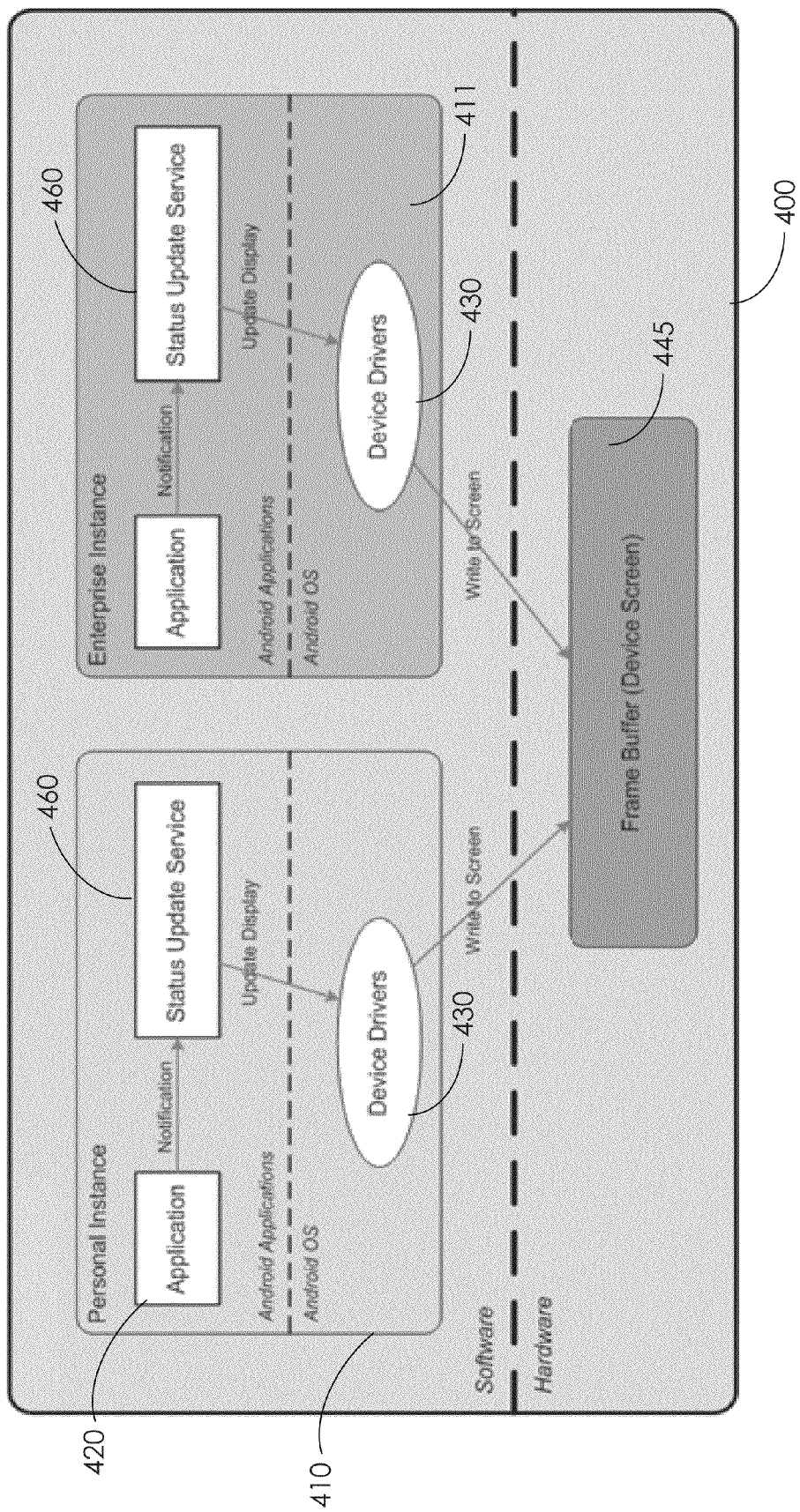

FIG. 4A is an exemplary embodiment of an electronic device 400 according to the present system. In this embodiment, a status update service 460 runs on the device processor (not shown in FIG. 4A) in each instance and updates the notifications rendered to the user, e.g. using a notification bar, using the display mode associated to its instance—active or dormant.

To that effect, a software layer (upper part) and hardware layer (lower part) are illustrated for each instance in FIG. 4A. In each one of these personas supported by the electronic device 400, here illustrated as the personal instance 410 and the business instance 411, a number of APs 420 are running and operatively connected to the status update service 460, also called here after a notification engine. This engine is in charge of collecting any notifications issued by the APs following an event, like for instance a data update.

In this illustrative embodiment of the present system, each status update service 460 knows which instance it is running in and whether that instance is active or not. The information may be collected e.g. from the login manager of the electronic device that handles the switching between the different instances, and passed on the status update service 460. Indeed, when a user switches between the currently active persona to the dormant persona, a broadcast message may be sent to the active status update service 460 instructing a change from active to dormant mode. Similarly, the dormant status update service receives an instruction to switch to active mode. In this manner each notification engine knows at all time which mode it is in.

Given this knowledge, and knowing the display mode associated with its instance, the status update engine 460 will update the notification bar using this display mode. To do so, the status engine service 460 will apply to the collected notifications the rules corresponding to its display mode. It will then control the device drivers 430 to render on the display device 445 a GUI of the notifications resulting from the applied display mode. This is illustrated in FIG. 2 with the icons in the notification bar 250. One may note that the rendering of the notifications from the different personas is seen by the user through the active instance.

Using an email AP as an example, let one assume the arrival of an email. Say the display modes for this event are that:
- the active persona, in this example the personal instance, will display email sender and email subject for each new message associated with that persona. The display rule is thus "extract metadata sender and metadata subject",
- only the number of email messages for the dormant persona, here the business persona, will be displayed. The display rule is then "display no details—count the number of notifications".

Thus, if the personal instance is active, its status update service 460 will enable to display the sender and subject for each new email message it was notified of. The update service 460 of the enterprise instance will allow only the display of the number of new messages it has been notified of.

In order to do this the status update service of any instance must know:
a) which instance it is running on and
b) which instance is currently active.

a) can be achieved through a number of techniques (e.g., at compilation time) and b) also could be achieved through a number of techniques, depending upon how the two instances are implemented—e.g., in the case of a virtualization model the VNC protocol could be used to communicate this information.

Figure 3:
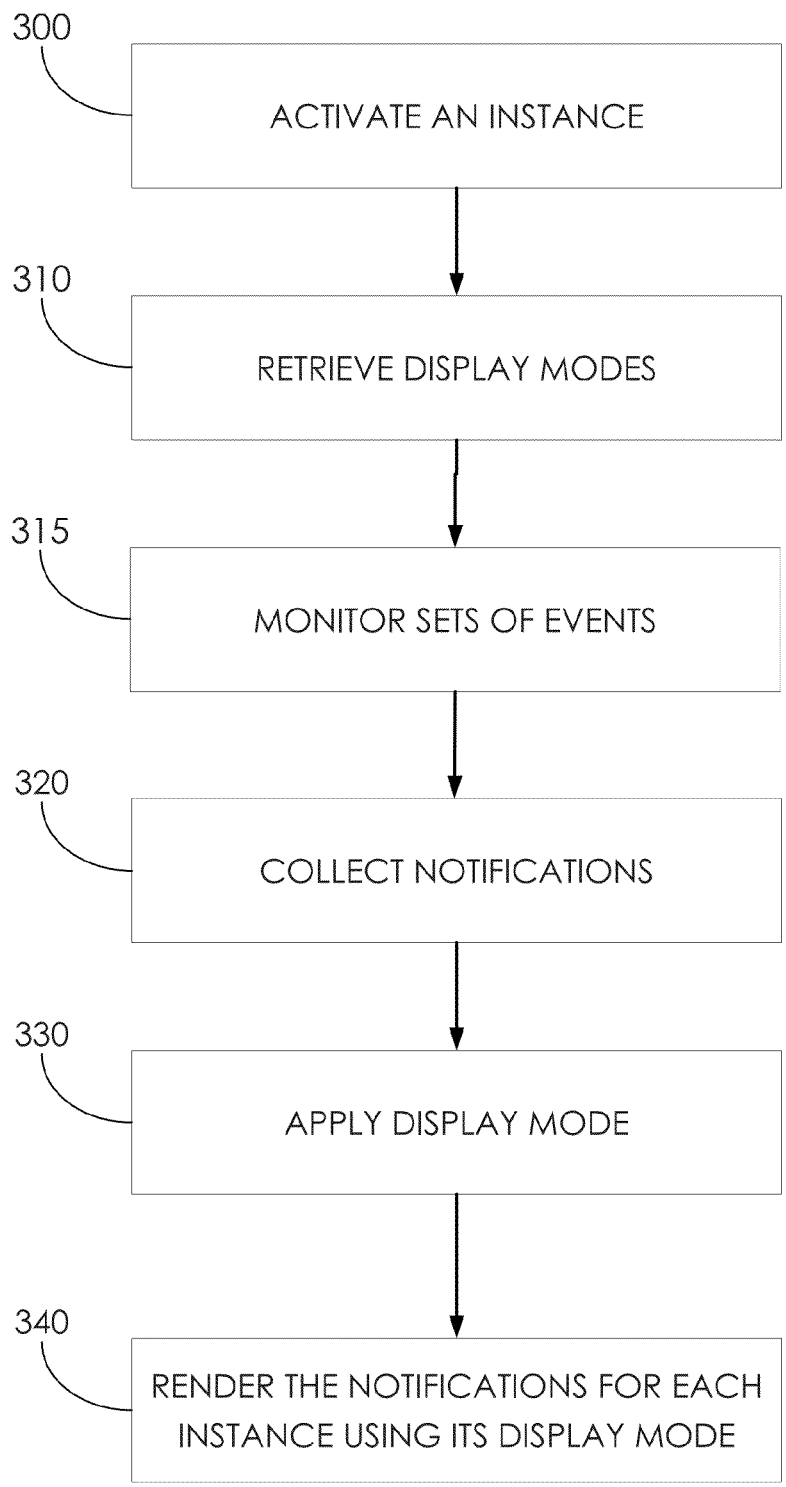
FIG. 3 represents a flowchart according to an embodiment of the present method; and, FIGS. 4A to 4D represent a communication device according to other embodiments of the present system.

FIG. 3 is a flowchart according to an illustrative embodiment of the present method. In a preliminary act 300, the user logs in one of the instance available on his electronic device. The selected instance becomes the active instance and informs its notification engine. Alternatively, the engine may be informed through a login manager handling the user login into the instance. A number of APs, running in the active instance, are subject to sets of events like e.g. updates. The active instance is aware of these events through the notification engine 460 described here above.

In this present embodiment, it is assumed that the other—dormant—instances are also aware of sets of events for other APs running thereon. This may be the case for instance if the APs for the dormant instance(s) are also triggered at startup of the active instance, or the dormant instance was the previous active instance (and the user switched to another instance). Using the embodiment of FIG. 4A, another notification engine 460 is also running per dormant instance, and aware of the sets of events happening for these instances.

In a further act 310, the display mode for each instance is retrieved by its status update engine 460. A database storing the different display modes (not shown in FIG. 4) may be accessible to the status update service 460. Based on different choices of implementation, the active display mode may be the same independently of the active instance. Whether the active instance is the enterprise (business) or personal one, the notifications for the instance the user is interacting with will be rendered the same way. The same can be said about a common display mode for dormant instances. This is illustrated in FIGS. 2D and 2E, where the same display modes are used for the active and dormant personas.

Alternatively, each persona may be associated to persona display profiles, comprising a display mode when this persona is active and a display mode when it is dormant. This allows to have distinct active persona display modes, whether e.g. the enterprise or personal instance is active. Distinct dormant display modes may also be achieved this way.

The display modes may be configured by the user through a display mode set up engine or uploaded to the electronic device through different communication routes.

Each engine 460 will then start monitoring (act 315) the events for all APs running on its instance on the electronic device 400. It will collect in its instance the notifications corresponding to the sets of events in a further act 320. The notifications may be stored in a notification buffer available in each instance. The collecting of the notifications may be performed over different periods of times. It may span over a fixed duration so that older notifications are discarded from the notification buffer. The notifications may alternatively be accumulated in the buffer as long as the user has not activated the notification window (see FIGS. 2D and 2E). The user, as in existing solutions, may be given the possibility of resetting the notification bar (as available with the Android™ OS). Different collecting techniques are available to the person skilled in the art and are beyond the scope of the present system.

In existing solutions today, these notifications are directly displayed to the attention of the user through the display device of the electronic device 400. Some filtering may be enabled to limit the display to information helping the user to evaluate the interest of the notifications. This filtering can be seen as display rules or a display mode applied to the collect notifications in act 320.

In the present system, each instance is characterized by its own display mode. In a further act 330, the display mode for an instance is applied by the instance notification engine 460 to all notifications collected in that instance.

In a subsequent act 340, the output of the applied display modes is rendered in the active instance. In other words, the notification engine in the active persona renders the active instance notifications using the active instance display mode, while the notification engine in a dormant persona renders the dormant instance notifications using the dormant instance display mode. These outputs are pushed and consequently visible to the user from the active instance thanks to display 445, e.g. following the exemplary GUIs of FIG. 2A-2E. The present system allows information about the dormant instance notifications to be visible in the active instance.

In an additional embodiment of the present method, the first display mode of the active instance is distinct from the second display mode of a dormant instance. If several dormant instances are available, they can share the same display mode, or have distinct display modes depending e.g. on the level of security attached to the persona.

As seen before, the display mode of the dormant instance (s) may be limited to the number of notifications, or include the AP causing the notifications.

In an additional embodiment of the present method, as the notifications comprise metadata associated to an event and/or the application causing the event, the first display mode may comprise displaying more metadata than the second display mode.

Having different display modes ensures that some information about the dormant instance notifications is kept from the user while interacting with the active instance.

As mentioned before, each display mode may comprise a selectable element (e.g. common or distinct). Upon selection by the user of this selectable element, the processor of the electronic device may:
  further display details, i.e. metadata, from the notifications, based on the relevant display mode, for instance in a notification window as illustrated in the exemplary embodiments of FIGS. 2D and 2E,
  offer the possibility to the user to switch persona through for instance the instance manager, if the user selects the selectable element for the dormant persona notifications. An authentication may then be needed to access the dormant persona. The notifications from the ex dormant, not active persona may then be displayed in full details, or the relevant display modes (taking into account which persona is the active and which one is dormant) may be applied.

More generally, the user may want to switch persona, without going through the selectable element. To do so, he will access the instance manager to log into another persona. In this case, the display modes may be updated so as to take into account which instance is the active one now. The notification bar, as in FIG. 2B, may still display the same numbers of notifications from the now active instance, and the now dormant instance, but display modes have changed. Say 3 notifications were available in the active instance, and 4 in the dormant one, prior to the switch of instances. The 3 notifications are accessible through the active instance display mode, while the 4 notifications are accessible through the dormant instance display mode (e.g. less detailed than the other mode). After the switch, 4 notifications will be available in the active mode, while 3 in the dormant. As the display modes are changed, further details are now available about the 4 notifications.

Figure 4B:
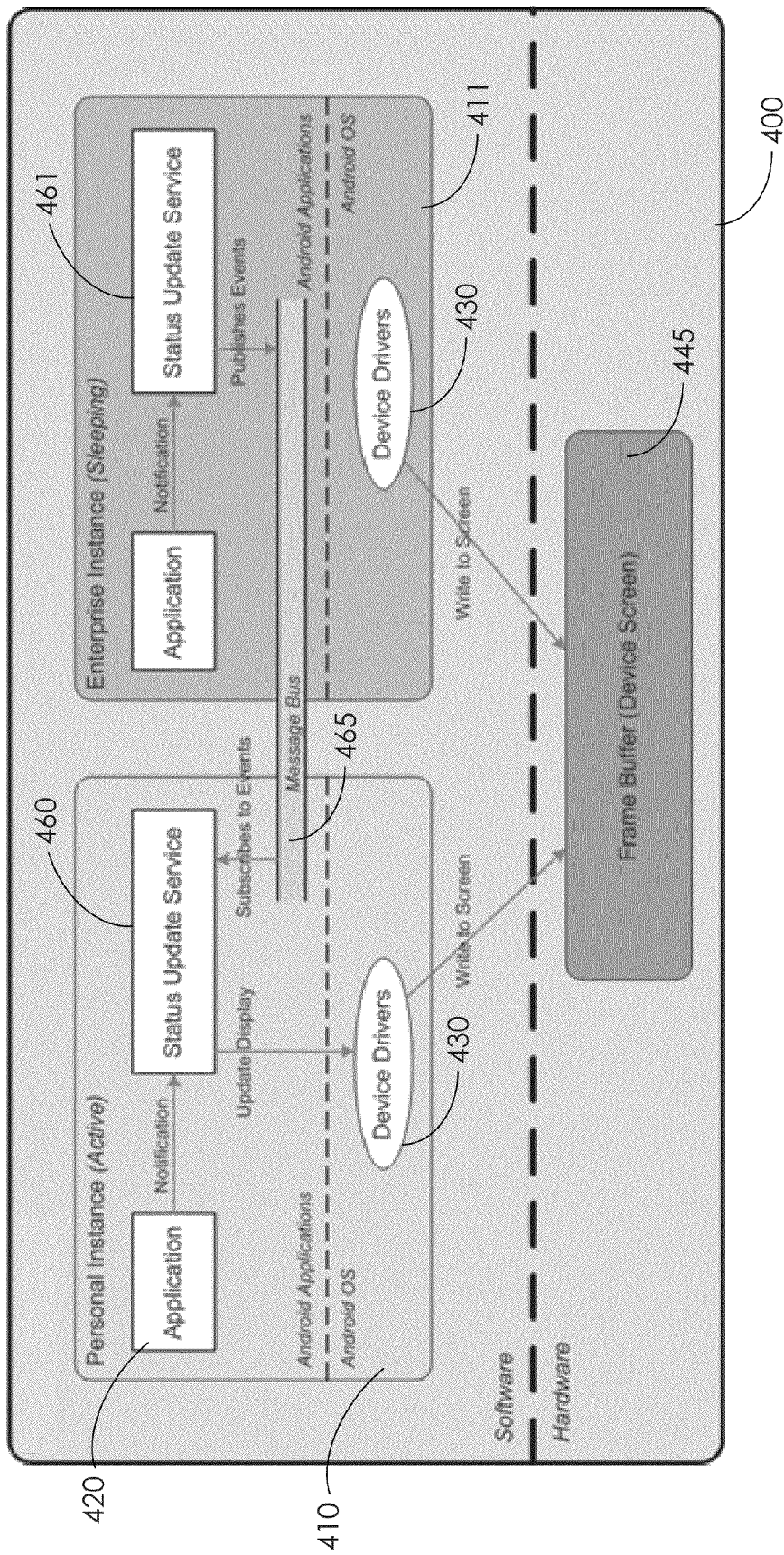
Figure 4C:
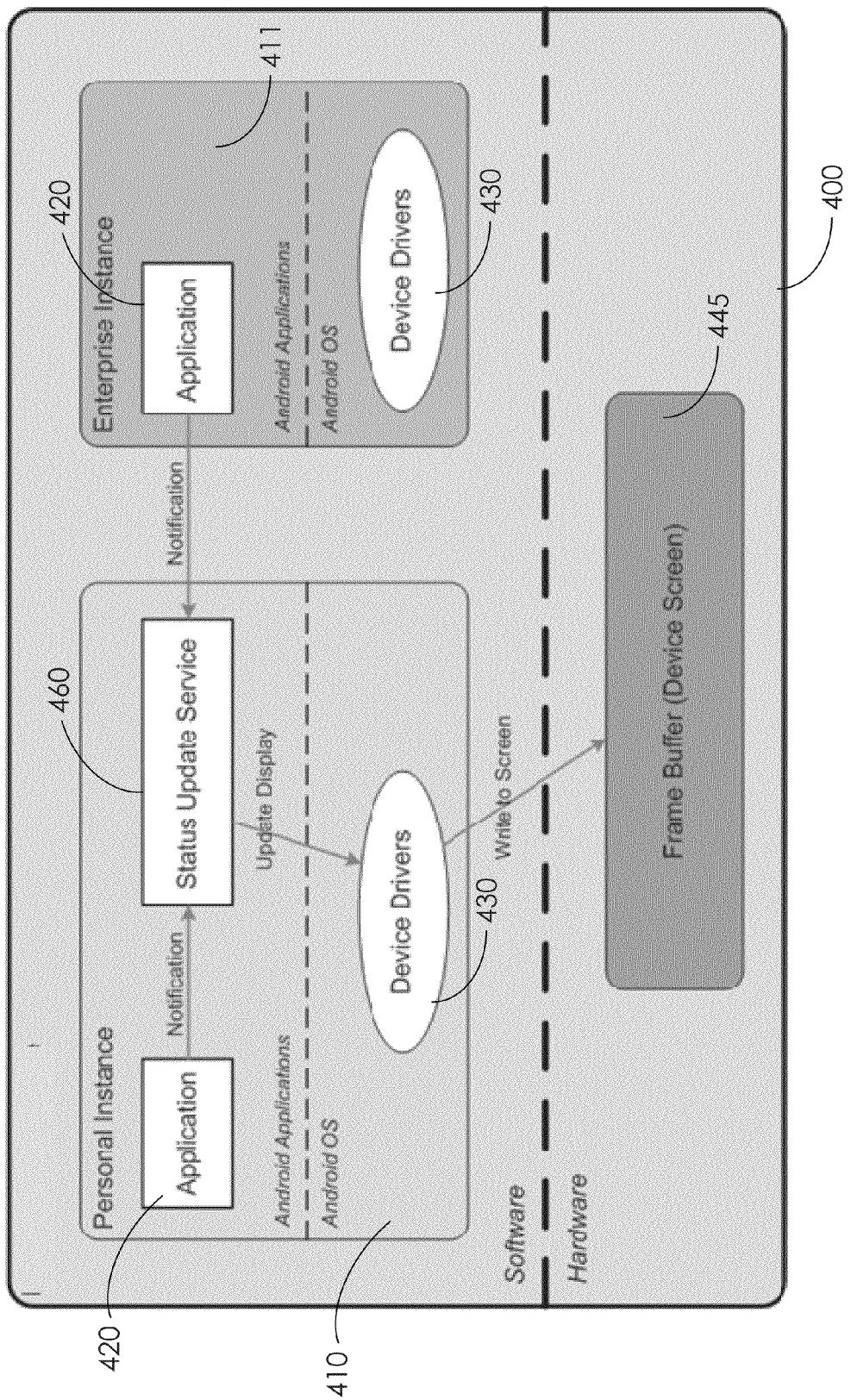
Figure 4D:
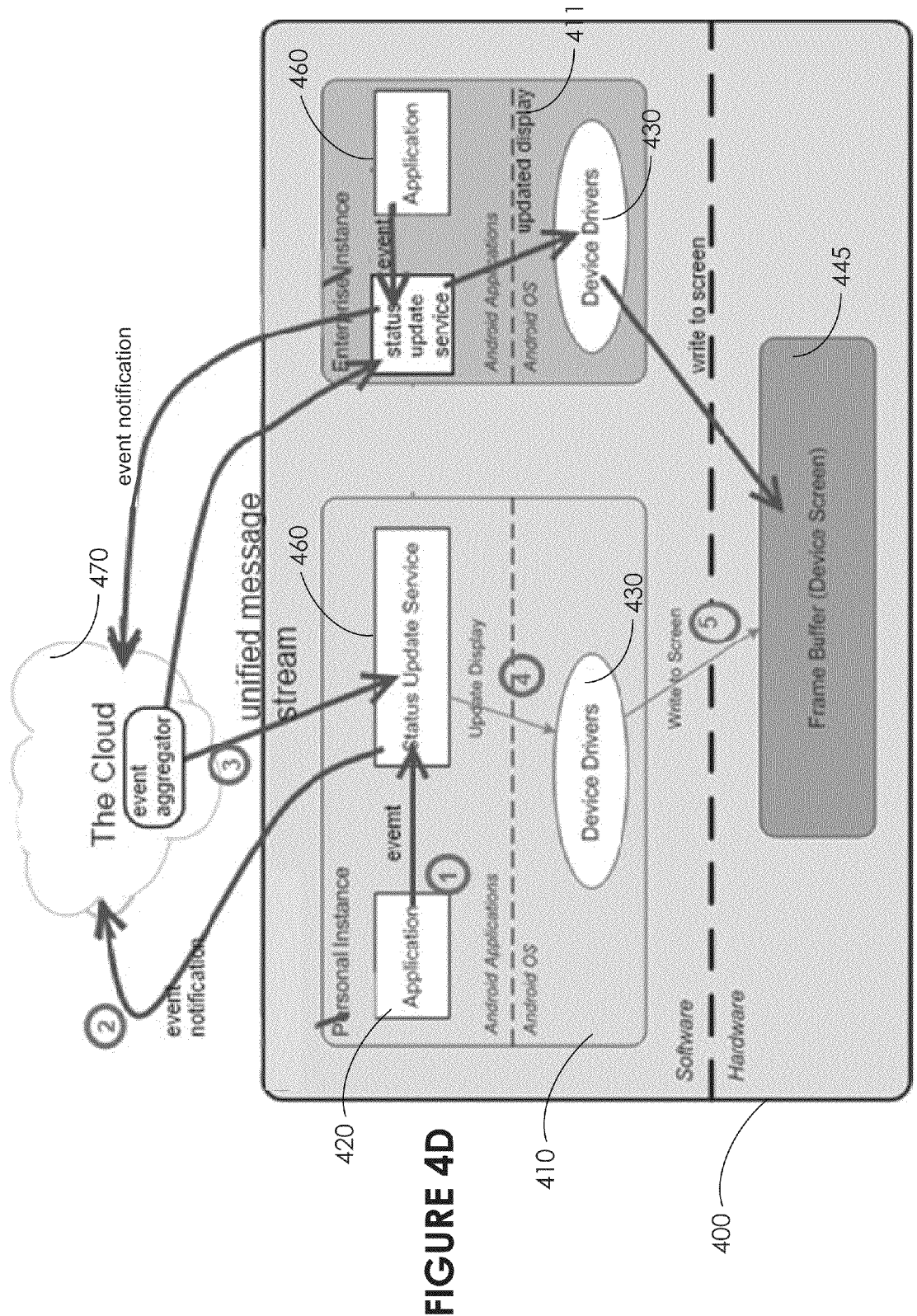

FIGS. 4B to 4D illustrate alternative embodiments of the present system. The same reference numbers refer to the same elements as with FIG. 4A. In the here after illustrations, just like in FIG. 4A, the different instances corresponds to different virtual machines running their own OS, here the Android™ OS for instance.

FIG. 4B illustrates another embodiment with a notification engine 460 per persona. A message bus 465 is used to communicate events from the dormant (business or enterprise) instance 411 to the active (personal) instance 410. The status update service 460 in the active instance receives event notifications from running applications 420 and displays those in the appropriate manner (e.g., for email, displaying the sender and subject), i.e. using the active instance display mode. The status service update 460 is thus responsible for collecting the notifications and applying the display mode in the active instance.

The service 460 also listens to the message bus for events occurring in the dormant (enterprise) instance, and displays these appropriately as well (e.g., for email, merely the number of unread email messages sent to the account associated with the dormant instance). Thus the status update service 461 of the dormant instance is only in charge of collecting the notifications from the applications 420 running thereon. These notifications are passed on the message bus 465 bridging the two instances and it is the notification engine 460 of the active instance, aware of the display mode for the dormant instance, that applies this second display mode.

In this particular embodiment, the status update service 460 of the active instance is thus in charge of implementing all instance display modes and rendering the notifications using these display modes.

The message bus 465 can channel notifications both way. Indeed, when the user makes the enterprise instance 411 active (rendering the personal instance 410 dormant), the personal instance update service 460 stops updating the notification bar and begins publishing event notifications from personal applications 420 onto the message bus 465. The already published notifications may be e.g. discarded or republished with the new display mode. The enterprise status update service 461 conversely begins updating the notification bar and listening for events on the message bus. With the switch in active instance, the status update service of the new active instance will take over the role of implementing all instance display modes and rendering the notifications.

The message bus could be implemented using a variety of protocols, e.g., VNC

FIG. 4C illustrates another embodiment of the present system. This embodiment uses a single status update service 460 to deal with events from both instances.

In this example, the status update service 460 runs on the personal instance 410 (though it could be either one). It receives event notifications from applications 420 running on the personal instance 410 and displays them to the notification bar appropriately (e.g., for email, displaying the sender and subject) using the first display mode. The service 460 also receives events from applications 420 running on the enterprise instance 411 and displays those appropriately as well (e.g. only the number of unread messages) using the second display mode. It may distinguish between the two streams of events because the service 460 listens to two different channels and knows which is associated with which instance, as well a which instance is active. In this embodiment, the notification engine 460 is aware of all sets of events and will apply the relevant display modes based on the channel information.

FIG. 4D is another exemplary embodiment of the present system. This embodiment leverages computing and network resources 470 external to the electronic device 400 to propagate notifications to the user notification bar. The external computing resources could be an aggregation such as "the cloud" 470 or it could be a specific server and network connection (e.g.: on premise). A status update service 460 runs in each operating system instance on the device 400 and notifies the external resources 470 of sets of events (step 1).

Meta-data passed for each event may comprise e.g. the event type, timestamp, which machine instance (identification of the virtual machine, as well as dormant/active state) passed the event, application generating the event, event link and event priority. In addition specific data related to the event is also passed externally. This varies per event and is passed as name value pairs. For example, an email received event would also pass along the sender email, date sent, email subject and first few lines of the message. Based on all of this information the display mode for each instance can determine what is needed for display and when.

The status update service 460 of each instance has knowledge of the external computing resources 470 and it passes on the event data (step 2) when a connection is present. Resources 470 may act as an event aggregator that orders the events, checks the correctness of the data and then returns all queued events from all instances back to all status update services 460 (step 3)

As described earlier, there are two display modes, or layouts of notifications, for example in a notification bar. Each status update service 460 running on each instance knows which instance it is running on and whether that instance is active or not. Given this knowledge, and the fact that all event information is sent from the external resources back to the virtual machine it originated from, each status update service 460 can then construct the correct layout appropriate for that instance, based on its display mode. In this embodiment, the rules for building the notification bar might be specific to each instance, i.e. the layout and information presented in the notification bar could be different depending on which instance the user is interacting with, as explained previously with act 310 of FIG. 3 (with different persona display profiles).

As stated in the previous techniques, the status update services 460 will know which instance they are associated with and if its instance is currently active. Based on the specific layout rules (display mode) for that instance, it can control the device drivers 430 appropriately. (step 4)

Lastly, the device screen 445 displays the notification bar with the correct event data and layout. (Step 5)

In an additional embodiment of the present system, one or more notifications may comprise an active link element, the display mode of the dormant instance will comprise the deactivation of this link element.

This may be seen as an additional level of filtering of notifications coming from an AP running under the dormant persona, notifications that may be clicked on by the user. Usually a notification will specify what action results upon its selection by the user. As the notifications from the dormant persona are seen with a different display mode, the action may be filtered out.

The default manifestation of a notification from the dormant persona, as seen through the dormant display mode, may cause the processor of the electronic device to switch personas and go to the application which generated the selected notification. The usual password entry and security that is associated with the persona switching would be required. However, the display mode for the dormant persona may apply a filter which does not let the usual instance switching happen. In effect, a user would see a notification but not be able to switch to it and take action via the notification icons.

Finally, the above discussion is intended to be merely illustrative of the present system and should not be construed as limiting the appended claims to any particular embodiment or group of embodiments. Thus, while the present system has been described with reference to exemplary embodiments of a mobile device, it should also be appreciated that numerous modifications and alternative embodiments may be devised by those having ordinary skill in the art without departing from the broader and intended spirit and scope of the present system as set forth in the claims that follow.

Indeed the present teachings may be transposable to any electronic device capable of running different instances that can generate sets of events, and corresponding notifications.

Furthermore, the present system has been illustrated with the limiting a strong segregation of information between instances running on an electronic device. The present system could be applied too to enforce some control policy over data getting shared between different personas, and avoid a detrimental transparency between different instances, like a personal and corporate one.

Further, while exemplary user interfaces are provided to facilitate an understanding of the present system, other user interfaces may be provided and/or elements of one user interface may be combined with another of the user interfaces in accordance with further embodiments of the present system.

The section headings included herein are intended to facilitate a review but are not intended to limit the scope of the present system. Accordingly, the specifications and drawings are to be regarded in an illustrative manner and are not intended to limit the scope of the appended claims.

In interpreting the appended claims, it should be understood that:

a) the words "comprising" or "including" do not exclude the presence of other elements or acts than those listed in a given claim;

b) the word "a" or an preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analogue and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method comprising:
   presenting notifications on an electronic device partitioned into two or more distinct instances, each instance being aware of separate sets of events associated to applications running in that instance and having a first, active display mode and a distinct second, dormant display mode for the notifications according to different display rules, wherein the second, dormant display mode hides at least some content associated with the notifications relative to the active display mode in which that content is visible, wherein presenting comprises:
      collecting for each instance the notifications corresponding to the separate sets of events, and
      rendering on a display device for an active one of the instances the notifications of the active instance using the first, active display mode, while at the same time rendering on the display device the notifications of the other instance using the second, dormant display mode.

2. The method according to claim 1, wherein rendering the notifications using the first or second display mode comprises a preliminary act of:
   presenting the number of collected notifications.

3. The method according to claim 2, wherein the act of presenting the number of collected notifications for each instance comprises presenting said number using one distinct or common selectable element.

4. The method according to claim 3, the act of the rendering the notifications of the active instance further comprising rendering metadata associated to the notifications for the active instance upon selection of a corresponding one of the distinct selectable elements.

5. The method according to claim 3, the act of the rendering the notifications of the other instance further comprising rendering metadata associated to the applications that caused the separate sets of events in the other instance upon selection of a corresponding one of the distinct selectable elements.

6. The method according to claim 1, wherein the notifications are associated to different categories, the rendering of the instance notifications using the first or second display mode comprising the acts of:
   presenting the number of collected notifications per category.

7. The method according to claim 1, wherein the first display mode is different from the second display mode.

8. The method according to claim 7, wherein each notification in the two or more distinct instances comprises metadata associated to at least one of an event or the associated application, the first display mode comprising displaying more metadata than the second display mode.

9. The method according to claim 1, wherein one or more of the notifications comprise an active link element, the second display mode comprising deactivating the link element.

10. A non-transitory storage medium comprising a computer program product recorded thereon and executable by a processor in the form of a software agent including at least one software module with instructions configured to implement a method for presenting notifications on an electronic device partitioned into two or more distinct instances, each instance being aware of separate sets of events associated to applications running in that instance, the instructions comprising:
   instructions that configure the processor to collect for each instance the notifications corresponding to the separate sets of events;
   instructions that define for each instance a first, active display mode and a distinct second, dormant display mode for the notifications according to different display rules, wherein the second, dormant display mode hides at least some content associated with the notifications relative to the active display mode in which that content is visible; and
   instructions that configure the processor to render on a display device for an active one of the instances the notifications of the active instance using the first, active display mode, while at the same time rendering on the display device the notifications of the other instance using the second, dormant display mode.

11. An electronic device comprising:
   a display device;
   two or more distinct, partitioned instances, each instance being aware of separate sets of events associated to applications running in that instance; and a processor configured to:
- collect for each instance the notifications corresponding to the separate sets of events;
- define for each instance a first, active display mode and a distinct second, dormant display mode for the notifications according to different display rules, wherein the second, dormant display mode hides at least some content associated with the notifications relative to the active display mode in which that content is visible; and
- render on a display device for an active instance one of the instances the notifications of the active instance using the first, active display mode, while at the same time rendering the notifications of the other instance using the second, dormant display mode.

* * * * *